US012716463B2

(12) United States Patent
Beilner et al.

(10) Patent No.: US 12,716,463 B2
(45) Date of Patent: Aug. 25, 2026

(54) VIBRATION DAMPER HAVING A HYDRAULIC CONNECTION

(71) Applicant: ZF FRIEDRICHSHAFEN AG, Friedrichshafen (DE)

(72) Inventors: Rainer Beilner, Bergrheinfeld (DE); Matthias Reuß, Werneck (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 398 days.

(21) Appl. No.: 18/280,018

(22) PCT Filed: Mar. 4, 2022

(86) PCT No.: PCT/EP2022/055610
§ 371 (c)(1),
(2) Date: Sep. 1, 2023

(87) PCT Pub. No.: WO2022/189303
PCT Pub. Date: Sep. 15, 2022

(65) Prior Publication Data

US 2024/0141969 A1 May 2, 2024

(30) Foreign Application Priority Data

Mar. 9, 2021 (DE) ..................... 10 2021 202 237.5

(51) Int. Cl.
*F16F 9/43* (2006.01)

(52) U.S. Cl.
CPC ................ *F16F 9/43* (2013.01); *F16F 9/435* (2013.01); *F16F 2230/06* (2013.01)

(58) Field of Classification Search
CPC ........... F16F 9/43; F16F 9/435; F16F 2230/06
USPC .................................................... 188/322.21
See application file for complete search history.

(56) References Cited

U.S. PATENT DOCUMENTS

| | | | | |
|---|---|---|---|---|
| 1,796,267 A | | 3/1931 | Moulton | |
| 2,909,248 A | * | 10/1959 | Gies .......................... | F16F 9/52 188/314 |
| 3,226,103 A | * | 12/1965 | Mcnenny ............. | B60G 17/048 188/315 |
| 3,659,684 A | * | 5/1972 | Porter .................. | A47C 1/0244 251/149.6 |
| 5,458,219 A | * | 10/1995 | Anderson ............... | F16F 9/092 188/315 |

(Continued)

FOREIGN PATENT DOCUMENTS

| | | | |
|---|---|---|---|
| DE | 10033871 | 4/2001 | |
| DE | 10004881 A1 * | 8/2001 | ................ F16F 9/43 |
| DE | 102016213957 | 2/2018 | |

(Continued)

*Primary Examiner* — Thomas J Williams
(74) *Attorney, Agent, or Firm* — COZEN O"CONNOR

(57) ABSTRACT

A vibration damper with a hydraulic connection includes a check valve and a venting valve. The check valve and the venting valve can be actuated separately, and a hydraulic communication between the vibration damper and a connection opening of the hydraulic connection is switchable via the check valve. The venting valve is hydraulically connected in parallel with the check valve, and the hydraulic connection has a filling connection which is outfitted with the venting valve. The filling connection is opened independent from the position of the check valve and is closed by the venting valve.

11 Claims, 7 Drawing Sheets

(56) References Cited

U.S. PATENT DOCUMENTS

| | | | | |
|---|---|---|---|---|
| 2022/0316546 | A1 | 10/2022 | Schmitt et al. | |
| 2024/0141969 | A1 * | 5/2024 | Beilner | F16F 9/43 |

FOREIGN PATENT DOCUMENTS

| | | | | | |
|---|---|---|---|---|---|
| DE | 102019206455 | | | 11/2020 | |
| GB | 519312 | A | * | 3/1940 | F16F 9/43 |
| GB | 2482414 | A | * | 2/2012 | F16F 9/36 |

* cited by examiner 3
1

VIBRATION DAMPER HAVING A HYDRAULIC CONNECTION

CROSS REFERENCE TO RELATED APPLICATIONS

This is a U.S. national stage of Application No. PCT/EP2022/055610 filed Mar. 4, 2022. Priority is claimed on German Application No. DE 10 2021 202 237.5 filed Mar. 9, 2021, the content of which is incorporated herein by reference.

BACKGROUND OF THE INVENTION

1. Field of the Invention

The disclosure is directed to a vibration damper with a hydraulic connection.

2. Description of the Related Art

DE 10 2016 213 957 A1 describes a vibration damper with two work chambers, each work chamber has a hydraulic connection. Each hydraulic connection comprises a check valve and a venting valve. The exact construction of the venting valve is not disclosed, but the venting valve has a screw-in body which, in its end position, contacts a support part of the hydraulic connection. A ball valve constructed as a slide valve serves as check valve. The support part has a receiving opening for the ball valve. The check valve and the venting valve represent completely separate individual valves which, moreover, are also spatially separate. In the construction according to DE 10 2016 213 957 A1, all of the components, i.e., the vibration damper, as well as the fluid lines, reservoir and the pump, are already pre-filled with working medium. After all of the components have been coupled, only a minimal amount of residual air need be discharged from the system.

The venting valve is functionally located between the check valve and a connection opening at the vibration damper. A hydraulic system coupled to the hydraulic connection, i.e., in this case, at least one reservoir and a pump, can only be vented when the check valve is open and both the vibration damper and the hydraulic system are accordingly vented in conjunction. It is impossible to vent the hydraulic system separately, since the venting valve and a connection opening of the vibration damper and the check valve are hydraulically connected in series.

SUMMARY OF THE INVENTION

A fundamental problem with a hydraulic connection of this constructional type consists in a comparatively large installation space requirement. There are vehicles in which a vibration damper of this type is not usable due to the lack of installation space.

An object of one aspect of the present invention to configure a vibration damper with a hydraulic connection in such a way that a space requirement for installation of the hydraulic connection is smaller compared with the prior art.

One aspect of the invention is that the venting valve is hydraulically connected in parallel with the check valve, and the hydraulic connection has a filling connection that is outfitted with the venting valve, and the filling connection is opened independent from the position of the check valve and is closed by the venting valve.

The advantage consists in that no prefilled connection lines need be used in the hydraulic system coupled to the hydraulic connection. Further, the hydraulic system can be vented without the vibration damper being affected. Consequently, a significant time advantage is achieved in the venting of the hydraulic system. In addition, an advantage with respect to installation space can be created by combining the filling connection with the venting valve.

The filling connection preferably has a filling channel in which the venting valve is arranged. Therefore, the filling channel also takes over the function of a venting channel, which facilitates channel routing inside of the hydraulic connection.

A further advantage with respect to installation space can be achieved in that the filling connection is constructed in a valve body of the check valve.

The check valve is constructed as a seat valve in order to minimize leakage inside of the hydraulic connection.

In a further advantageous embodiment, the valve body is constructed as an axially movable closing pin. Such a valve body offers favorable prerequisites for the channel routing inside of the hydraulic connection.

The hydraulic connection preferably comprises a connection housing in which the valve body is axially movably supported, and the connection housing has a stop for limiting the path of the valve body. The valve body can be brought into a maximum open position without the valve body being able to fall out of the connection housing. This embodiment also facilitates a one-handed operation of the hydraulic connection.

According to an aspect of the invention, the stop is formed by a separate stop ring. The connection housing itself can be constructed very simply in that the stop ring is configured, e.g., in the form of a snap ring.

As a further measure for a simple handling of the hydraulic connection, it is provided that the valve body has a sealing flange that seals off a connection chamber with a wall of the hydraulic connection. No work medium can escape from the hydraulic connection even when the check valve is open to the maximum extent.

The valve body of the check valve has a connection profile for a filling valve so that the process of filling a hydraulic system can be carried out as simply as possible via the hydraulic connection. A filling hose is simply placed on the connection profile and then removed again subsequently. Thereafter, no component part, which is generally never to be used again, remains on the hydraulic connection.

In addition to the venting valve, which closes the filling channel, the filling channel is closed by a screw plug. The screw plug serves as protection against misuse and as a second barrier against loss of pressure medium.

A further measure to facilitate operation of the hydraulic connection consists in that the screw plug is connected to the valve body of the check valve via a thread whose breakaway torque is less than the actuation torque for the check valve. Accordingly, the valve body of the check valve need not be blocked by an additional handhold in order to open the venting valve.

A particularly space-saving form with respect to the actuation of the closing valve consists in that the valve body has a tool surface for adjusting the operating position. Therefore, there is no need for a handhold or the like which would have to remain on the closing valve.

Particularly in order to protect the connection profile for the filling valve, the valve body of the check valve is partially covered by a protective sleeve which is force-transmittingly connected to the valve body of the check valve and has a tool surface for adjusting the operating position. Accordingly, an actuation of the check valve can be performed even when the screw plug of the filling channel is closed.

BRIEF DESCRIPTION OF THE DRAWINGS

The invention will be described in more detail with reference to the following description of the drawings. The drawings show:

FIG. 5 is a longitudinal section through the hydraulic connection;

DETAILED DESCRIPTION OF THE PRESENTLY PREFERRED EMBODIMENTS

Figures 1A, 1B, 1C:
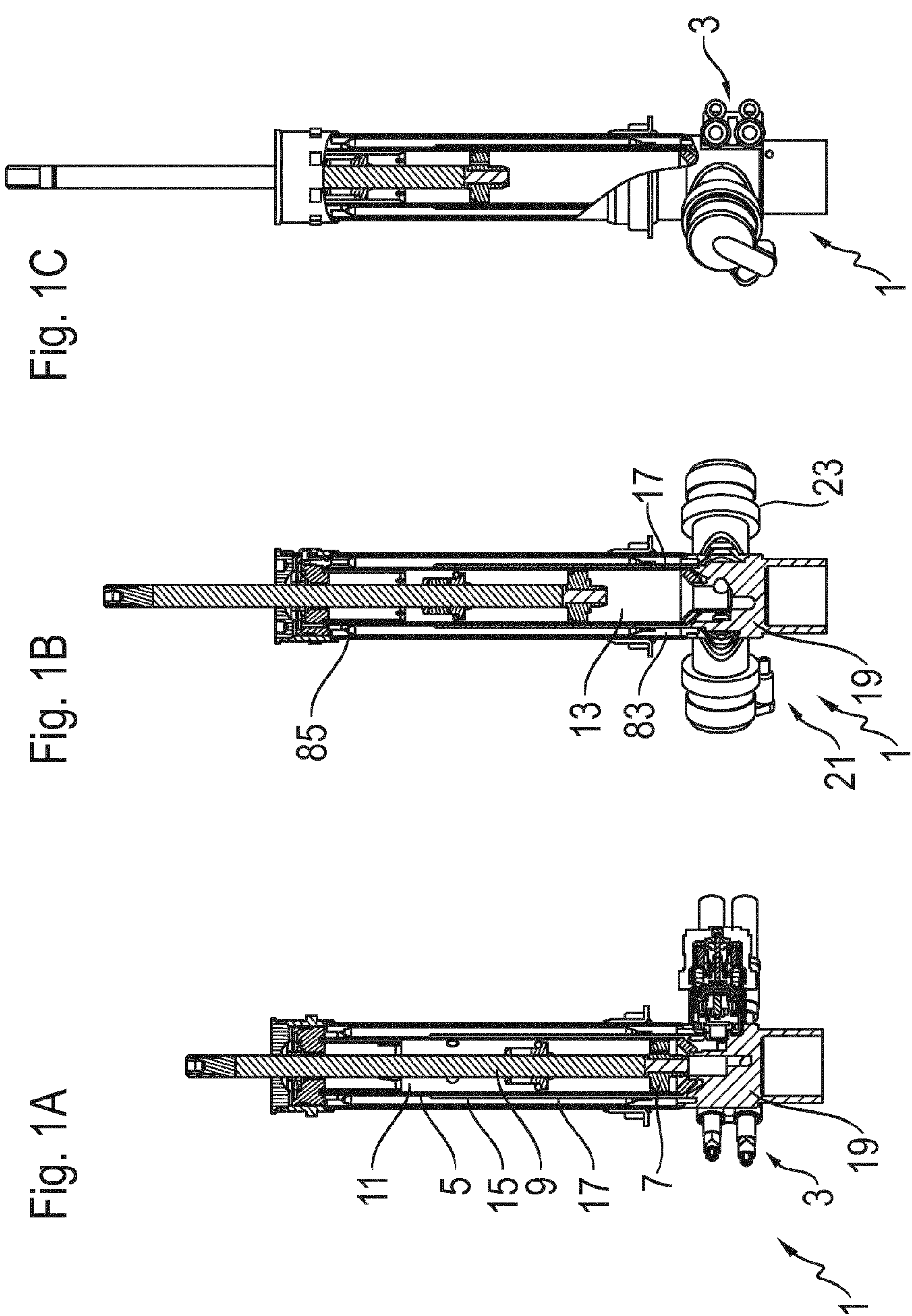
FIGS. 1A-1C are a vibration damper with a hydraulic connection in longitudinal section.

FIGS. 1A to 1C show a vibration damper 1 with a hydraulic connection 3. A piston 7 is axially movably guided at a piston rod 9 in an inner cylinder 5. The piston 7 divides the inner cylinder 5 into a work chamber 11 on the piston rod side and a work chamber 13 remote of the piston rod. Both work chambers 11; 13 are completely filled with a hydraulic damping medium. Further, the two work chambers 11; 13 are hydraulically connected, respectively, with a separately adjustable damping valve 21; 23 via an intermediate tube 15 which forms a fluid line 17 and a line block 19. The specific construction design of the adjustable damping valves 21; 23 is not germane to the present invention. With respect to the construction of the line block 19, reference is made by way of example to DE 10 2019 206 455 A1, the disclosure of which is incorporated herein. In principle, the vibration damper can also be constructed without adjustable damping valves 21; 23 or line block 19.

Figure 2:
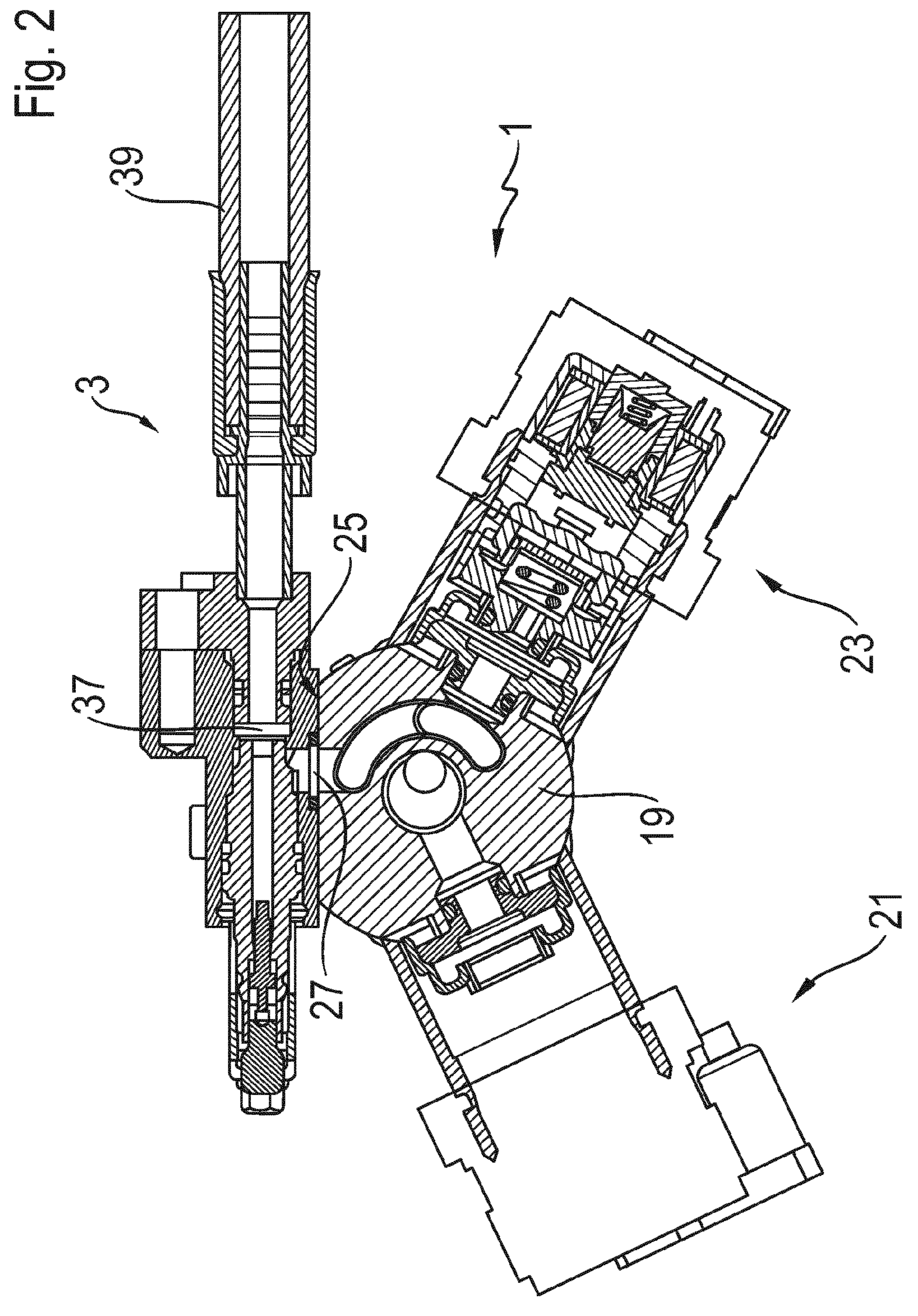
FIG. 2 is cross section through the vibration damper in the region of the hydraulic connection.
Figure 3:
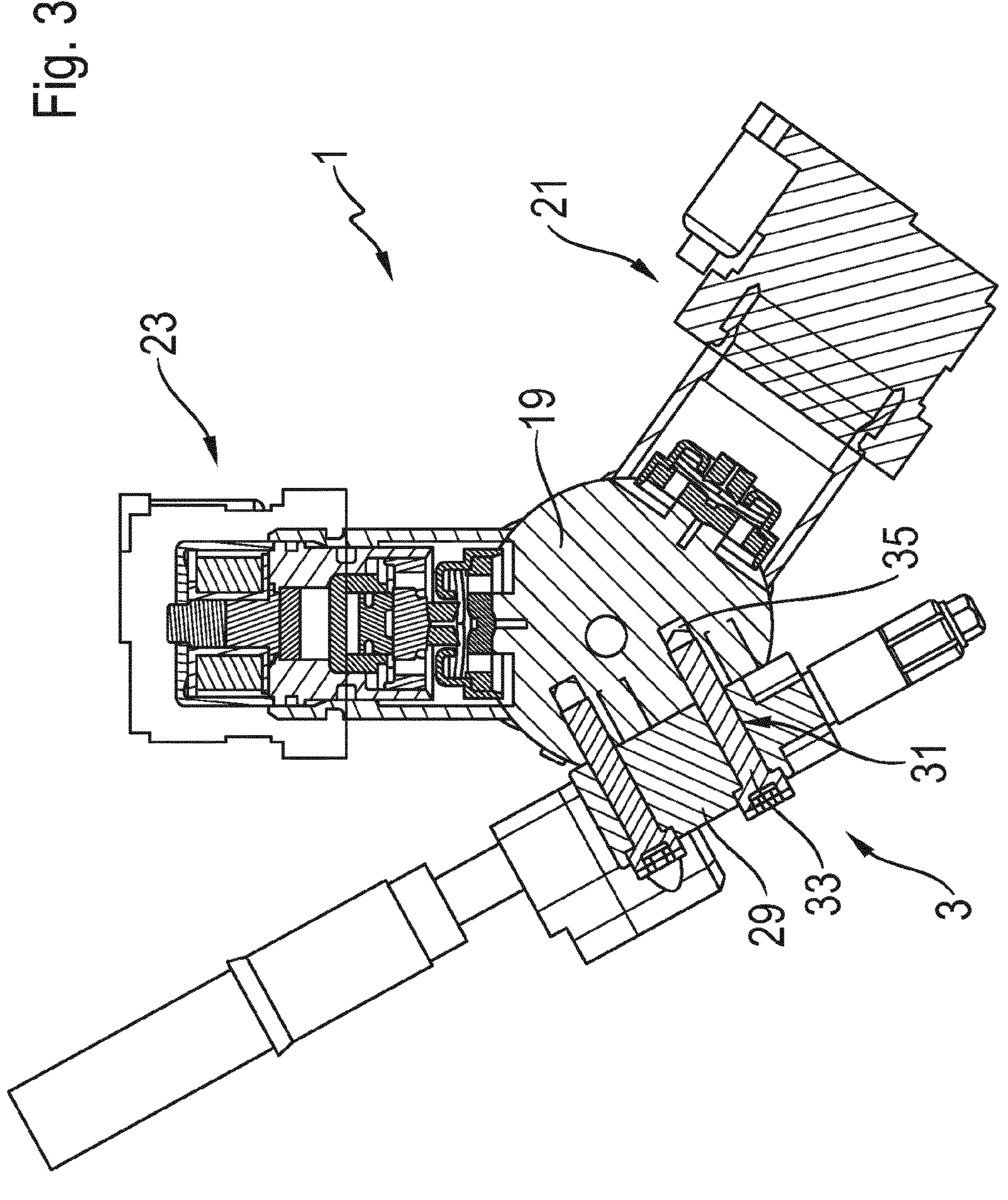
FIG. 3 is cross section through the vibration damper in the region of the attachment of the hydraulic connection to the vibration damper.

The hydraulic connection 3 is arranged externally at the vibration damper 1, preferably at the line block 19. As is shown in FIG. 2, the vibration damper 1 has an outer connection surface as plane surface 25 for this purpose so that a connection opening 27 of the hydraulic connection 3 is connectible in a very simple manner to the line block 19 and, therefore, to the work chambers 11; 13 of the vibration damper 1. FIG. 3 shows the mechanical connection between the hydraulic connection 3 and the vibration damper 1. Two through-openings 31, for example, are constructed in a connection housing 29 (see also FIG. 4). Fasteners 33, e.g., fastening screws, for example, which are screwed into threaded pocket bore holes 35 of the line block engage in the two through-openings 31.

The connection housing 29 has at least one connection opening 37 to a hydraulic system 39, e.g., a pump or a reservoir. The configuration of the hydraulic system 39 is merely shown schematically in the drawings by a portion of a line.

Figure 4:
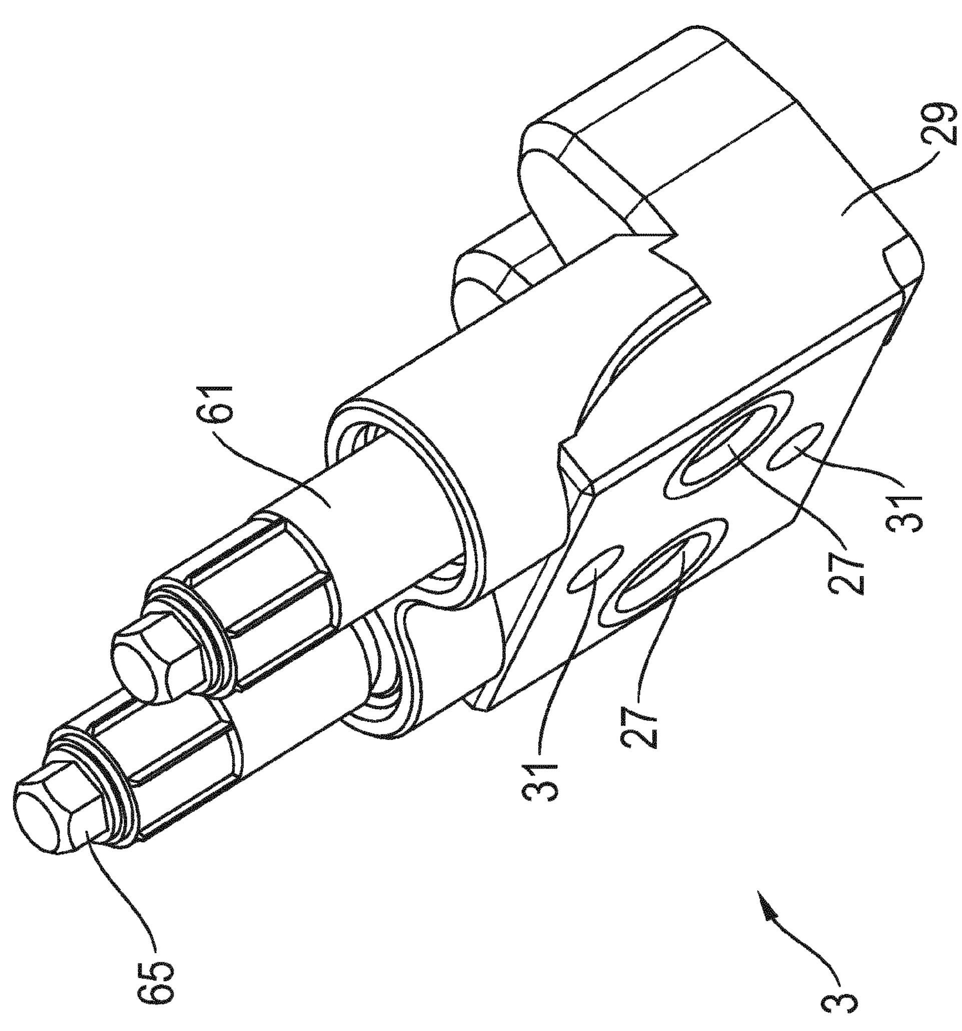
FIG. 4 is a perspective view of the hydraulic connection as individual part.

As is shown in FIG. 4, the hydraulic connection 3 can also have a plurality of connection openings 37A; 37B, preferably one connection opening connected to the work chamber 11 on the piston rod side and one connection opening connected to the work chamber 13 remote of the piston rod.

Figure 5:
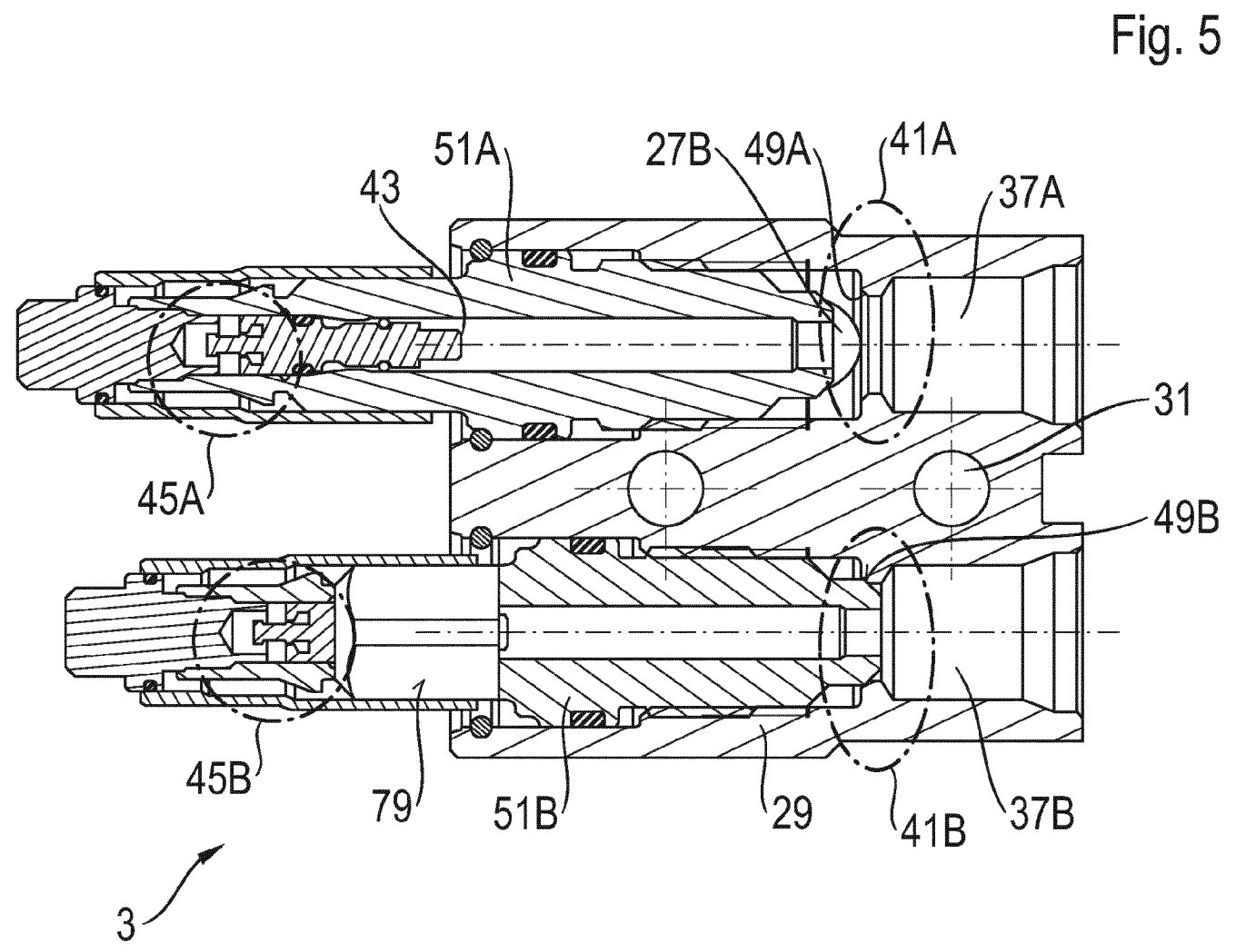
Figure 6:
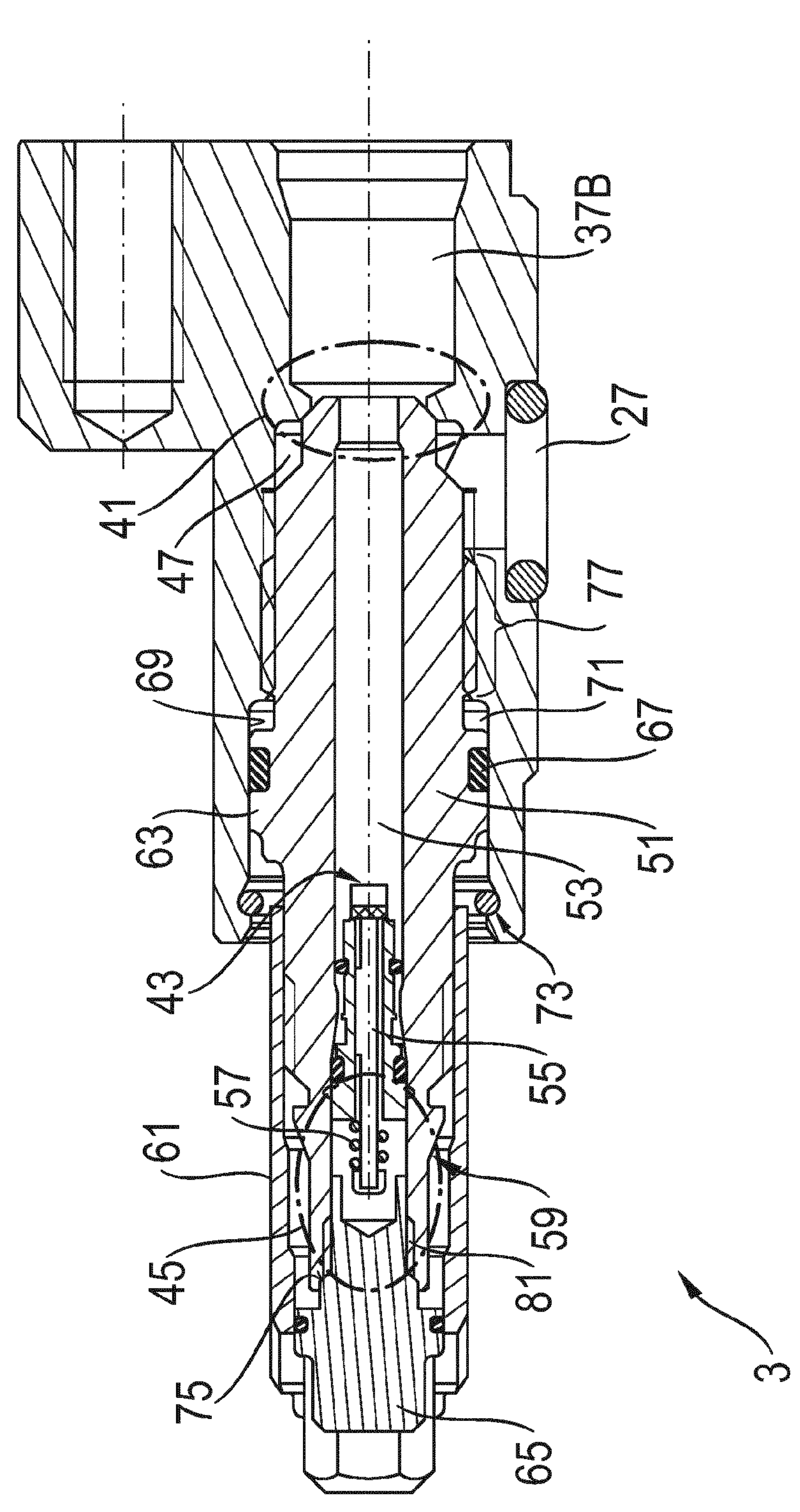
FIG. 6 is a longitudinal section through the hydraulic connection.

FIGS. 5 and 6 show the hydraulic connection 3 in a longitudinal sectional view. The hydraulic connection 3 comprises a check valve 41, a venting valve 43, and a filling connection 45. When FIGS. 5 and 6 are viewed in conjunction, it will be seen that the communicating orifice 27 and the respective connection opening 37 are connectible to one another via an angle channel 47. A valve seat surface 49 for the check valve 41 constructed as a seat valve is formed inside of the angle channel 47.

FIG. 5 shows the check valve 41B for the connection opening 37B in a closed position. A valve body 51B of the check valve 41B contacts the seat surface 49B of the connection housing 29 by its conical valve surface. On the other hand, the parallel valve body 51A for the other connection opening 37A is in a through-pass position as will be apparent from a glance at the communicating orifice 27B.

The valve body 51 of the check valve 41 has an axially extending filling channel 53, which is open to two sides. The venting valve 43 is arranged inside of the filling channel 53. The closing member 55 of the venting valve 43 is permanently preloaded in closing direction by a spring 57. On its outer lateral surface, the valve body 51 has a connection profile 59 for a filling valve. The connection profile 59 comprises a ramp with an undercut for the filling valve. With this, a switchable connection between the valve body 51 with the filling channel 53 and the filling valve, not shown, can be closed or opened. The hydraulic connection 3 has a protective sleeve 61 in each instance to protect the connection profile 59. The protective sleeve 61 extends from a sealing flange 63 to a screw plug 65.

The valve body 51 of the check valve 41 is constructed as a closing pin with the circumferential sealing flange 63 in which an annular seal 67 is accommodated. The annular seal 67 seals off a connection space 71 adjoining the angle channel 47 with a wall 69 of the hydraulic connection. The connection space 71 extends from the connection opening 27 to the maximum open position of the check valve 41 in which the valve body 51 contacts a stop 73 of the connection housing 29 for limiting the path of the valve body 51. This stop 73 is preferably formed by a simple snap ring which is held in a circumferentially extending annular groove by its residual stress.

It is further shown in FIGS. 5 and 6 that the filling channel 53 is closed to the outer environment or atmosphere by the screw plug 65. The screw plug 65 has a seat surface 75 which, in the closed state, is supported on a seat surface enclosing an inlet opening of the filling channel 53. Accordingly, if the venting valve 43 loses its tightness, the screw plug prevents damping medium from exiting the vibration damper 1 and/or the connected hydraulic system 39.

In order to move the valve body 51 from one operating position to another, the valve body 51 must be rotated inside of the connection housing 29 via a thread 77 and accordingly moved axially. To this end, the valve body 51 has at least one tool surface 79, e.g., an external hexagon, as is shown in FIG. 5. The tool surface 79 is formed axially between the connection profile 59 for the filling valve and the sealing flange 63 so that an actuation of the valve body 51 is also possible when the filling valve is connected. The screw plug 65 is likewise fastened with a thread 81 inside of the filling channel 53. The breakaway torque of the thread 81 of the screw plug 65 is less than the actuation torque of the check valve 41 so that no displacing movement of the check valve 41 occurs when the screw plug 65 is opened.

To mount the vibration damper 1, the vibration damper 1 is assembled completely, including the hydraulic connection 3, and is filled with damping medium. The two check valves 41A; 41B are in the blocking position so that no damping medium can escape even if a pressure gas cushion is formed in a compensation chamber 83 of the vibration damper, e.g., via a gas bag 85, as is shown in FIGS. 1A to 1C. The venting valve 43 and the screw plug 65 are also mounted.

When the vibration damper 1 is mounted in a predetermined application, the hydraulic system 39 is connected to the hydraulic connection 3. The protective sleeve 61 and the screw plug 65 are subsequently removed from the valve body 51. In a further work step, a filling valve is pressed onto the filling connection 45 so that the venting valve 43 is opened. The required amount of damping medium is supplied in the valve body 51 via the filling channel 53. After removing the filling valve, the venting valve 43 resumes its closed position in the filling channel 53. Subsequently, the venting valve 43 can be actuated once again for monitoring by actuating the closing body once again in lift direction against the spring 57. After the venting process, the check valve 41 can be moved into the through-pass position (see check valve 41A). The vibration damper 1 is now connected to the hydraulic system 39 via the hydraulic connection 3.

Lastly, the protective sleeve 61 is slid onto the valve body 51 and the screw plug 65 is fitted. The vibration damper 1 is accordingly ready to work.

Figure 7:
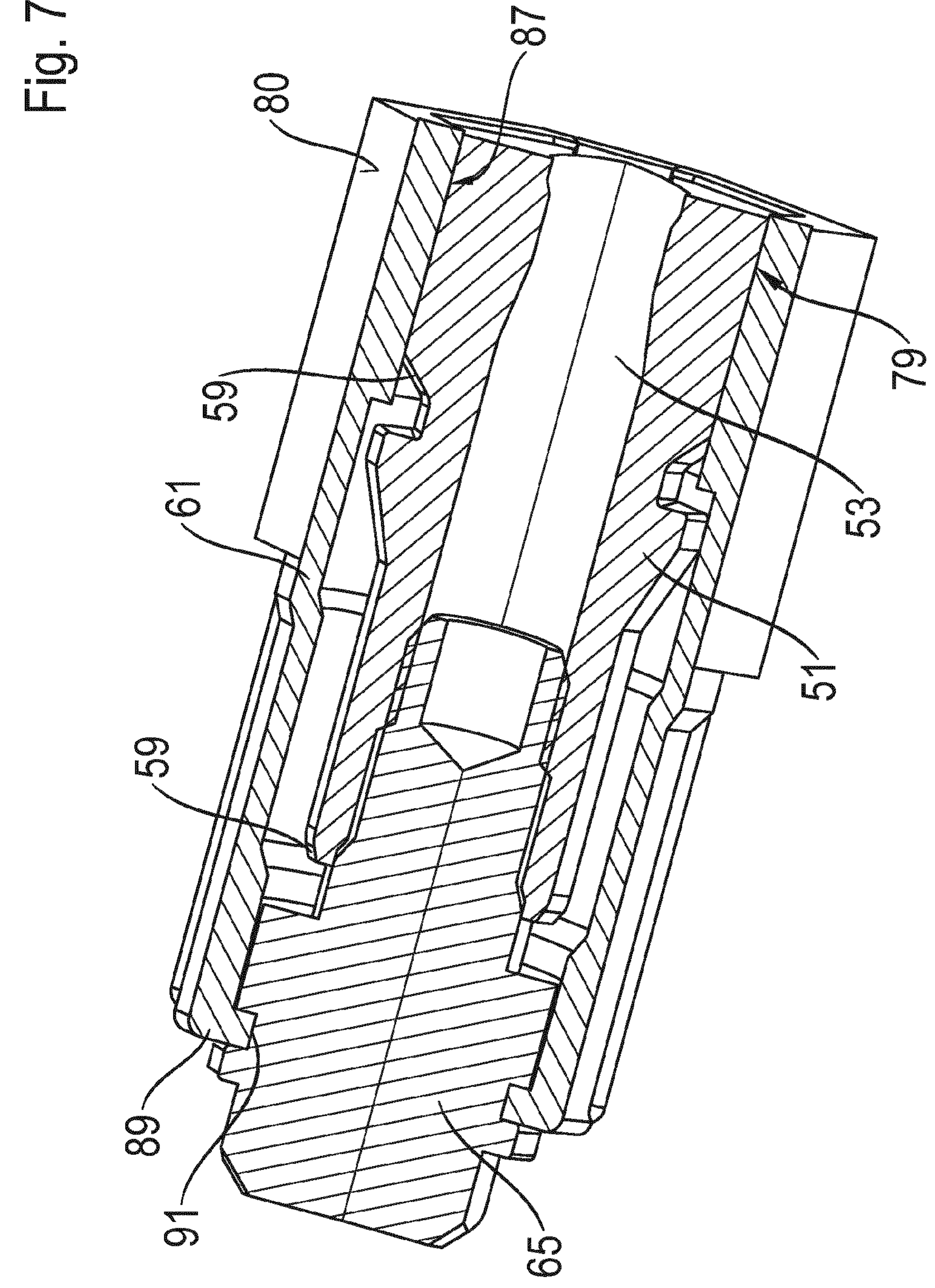
FIG. 7 is a detailed view of a valve body with protective sleeve.

FIG. 7 shows a modification of the combination of valve body 51, protective sleeve 61 and screw plug 65. In this construction, the protective sleeve 61 has an inner profile 87 which engages with the tool surface 79 of the valve body 51 in a torque-transmitting manner. The protective sleeve 61 preferably has a similar tool surface 80 so that it is also possible to actuate the check valve 41 by rotating the protective sleeve 61 without the protective sleeve 61 needing to be removed in order to do this.

However, when the screw plug 65 is unscrewed from the valve body 51, the protective sleeve 61 is then removed from the valve body 51 because the protective sleeve 61 has a radially inwardly directed circumferential web 89 which engages in a slot 91 of the screw plug 65. This positive engagement connection can be closed by the web 89 locking into the circumferential slot 91. Due to the minimal load, the protective sleeve 61 can be produced from a plastic in a very simple manner and can have a certain elasticity, which is sufficient for this assembly process.

When fitting the protective sleeve 61, the inner profile 87 of the protective sleeve 61 is aligned with the tool surfaces 79 of the valve body. The screw plug 65 can then be screwed into the filling channel 53, and the protective sleeve 61 carries out an axial movement but not a rotational movement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vibration damper comprising:

a hydraulic connection comprising:

a check valve configured to switch a hydraulic communication between the vibration damper and a connection opening of the hydraulic connection;

a venting valve hydraulically connected in parallel with the check valve, wherein the check valve and the venting valve are configured to be actuated separately; and a filling connection which is outfitted with the venting valve, wherein the filling connection is opened independent from a position of the check valve and is closed by the venting valve, wherein the filling connection has a filling channel in which the venting valve is arranged, and wherein the filling connection is constructed in a valve body of the check valve.

2. The vibration damper according to claim 1, wherein the check valve is constructed as a seat valve.

3. The vibration damper according to claim 2, wherein the valve body is constructed as an axially movable closing pin.

4. The vibration damper according to claim 3, wherein the hydraulic connection comprises a connection housing in which the valve body is axially movably supported, wherein the connection housing has a stop for limiting a path of the valve body.

5. The vibration damper according to claim 4, wherein the stop is a separate stop ring.

6. The vibration damper according to claim 1, wherein the valve body has a sealing flange that seals off a connection chamber with a wall of the hydraulic connection.

7. The vibration damper according to claim 1, wherein the valve body of the check valve has a connection profile for a filling valve.

8. The vibration damper according to claim 1, wherein the filling channel is closed by a screw plug.

9. The vibration damper according to claim 8, wherein the screw plug is connected to a valve body of the check valve via a thread with a breakaway torque is less than an actuation torque for the check valve.

10. The vibration damper according to claim 1, wherein the valve body has a tool surface for adjusting an operating position.

11. The vibration damper according to claim 10, wherein the valve body of the check valve is partially covered by a protective sleeve which is force-transmittingly connected to the valve body of the check valve and has a tool surface for adjusting the operating position of the check valve.

* * * * *